US012220032B2

(12) United States Patent
Bloom

(10) Patent No.: US 12,220,032 B2
(45) **Date of Patent: *Feb. 11, 2025**

(54) HAND BAG WITH INTEGRATED FINGERPRINT LOCK AND ZIPPER AND/OR FLAP CLOSURE

(71) Applicant: Rachel Bloom, Kettering, OH (US)

(72) Inventor: Rachel Bloom, Kettering, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,155

(22) Filed: Oct. 7, 2022

(65) Prior Publication Data

US 2023/0107278 A1 Apr. 6, 2023

Related U.S. Application Data

(63) Continuation of application No. 16/241,313, filed on Jan. 7, 2019, now Pat. No. 11,464,307.

(51) Int. Cl.

| | |
|---|---|
| ***A45C 13/18*** | (2006.01) |
| ***A45C 3/00*** | (2006.01) |
| ***A45C 3/06*** | (2006.01) |
| ***A45C 13/10*** | (2006.01) |
| ***E05B 47/00*** | (2006.01) |
| ***E05B 65/52*** | (2006.01) |
| ***G07C 9/00*** | (2020.01) |

(52) U.S. Cl.

CPC .............. *A45C 13/18* (2013.01); *A45C 3/001* (2013.01); *A45C 3/06* (2013.01); *A45C 13/103* (2013.01); *E05B 47/0001* (2013.01); *E05B 65/5284* (2013.01); *G07C 9/00563* (2013.01)

(58) Field of Classification Search

CPC ......... A45C 13/18; A45C 3/06; A45C 13/103; A45C 3/001; G07C 9/00563; G07C 9/257; G07C 9/00896; E05B 65/5284; E05B 47/0001; E05B 2035/009

See application file for complete search history.

(56) References Cited

U.S. PATENT DOCUMENTS

| | | | | |
|---|---|---|---|---|
| 2,822,013 A | | 2/1958 | Renz | |
| D285,868 S | | 9/1986 | Davis et al. | |
| 4,817,769 A | * | 4/1989 | Saliba | A45C 3/02 190/18 R |
| 4,913,283 A | | 4/1990 | Stuhn | |
| 5,138,468 A | | 8/1992 | Baebanell | |
| D383,492 S | | 9/1997 | Semon et al. | |
| D407,432 S | | 3/1999 | Tell | |
| 5,963,657 A | | 10/1999 | Bawker et al. | |
| D422,411 S | | 4/2000 | Martin | |
| 6,374,652 B1 | | 4/2002 | Hwang | |

(Continued)

FOREIGN PATENT DOCUMENTS

| | | | |
|---|---|---|---|
| CN | 200990955 Y | * | 12/2007 |
| CN | 10134798 A | | 1/2009 |

(Continued)

OTHER PUBLICATIONS

Sheng-Jue: (CN 108078133A ) translation. (Year: 2023).*

*Primary Examiner* — Don M Anderson
*Assistant Examiner* — Justin Caudill
(74) *Attorney, Agent, or Firm* — Thomas E. Lees, LLC

(57) ABSTRACT

A hand bag having providing an open top has a zipper for closing the open top and has a tab for connecting to a fingerprint lock mounted on the hand bag.

5 Claims, 16 Drawing Sheets

(56) References Cited

U.S. PATENT DOCUMENTS

| | | | | |
|---|---|---|---|---|
| 6,401,501 | B1 | 6/2002 | Kajuch et al. | |
| D469,952 | S | 2/2003 | Daglow et al. | |
| D492,485 | S | 7/2004 | Domotor et al. | |
| 6,865,913 | B2 | 3/2005 | Yamagishi | |
| 6,980,672 | B2 | 12/2005 | Saito et al. | |
| 7,043,060 | B2 | 5/2006 | Quintana | |
| D576,403 | S | 9/2008 | Leslie et al. | |
| D584,895 | S | 1/2009 | Holzner et al. | |
| D615,296 | S | 5/2010 | Bassee | |
| D651,393 | S | 1/2012 | Coleman | |
| D691,584 | S | 10/2013 | Nussbaum et al. | |
| D694,002 | S | 11/2013 | Bland | |
| 8,847,760 | B1 * | 9/2014 | Watkins, Jr. | A45C 13/18 340/568.1 |
| D733,978 | S | 7/2015 | Bayless | |
| D742,631 | S | 11/2015 | Kim | |
| D748,909 | S | 2/2016 | Wronski et al. | |
| D771,373 | S | 11/2016 | Kim | |
| 9,512,647 | B2 * | 12/2016 | Meersschaert | A45C 13/103 |
| D809,788 | S | 2/2018 | Fusi | |
| D815,431 | S | 4/2018 | Fusi | |
| D820,588 | S | 6/2018 | Nair | |
| D834,311 | S | 11/2018 | Tomasetta | |
| D841,318 | S | 2/2019 | Carter et al. | |
| D844,323 | S | 4/2019 | Shuai et al. | |
| D847,494 | S | 5/2019 | Tang | |
| D853,717 | S | 7/2019 | Shuai et al. | |
| D856,677 | S | 8/2019 | Gill et al. | |
| D866,956 | S | 11/2019 | Wu | |
| D867,750 | S | 11/2019 | Warren | |
| D869,149 | S | 12/2019 | Okungbaiye | |
| 2004/0025550 | A1 | 2/2004 | Yamagashi | |
| 2004/0066366 | A1 * | 4/2004 | Jung | G06F 1/1628 345/156 |
| 2004/0237605 | A1 * | 12/2004 | Lin | A44B 19/301 70/68 |
| 2004/0255623 | A1 | 12/2004 | Sun et al. | |
| 2008/0012686 | A1 | 1/2008 | Bonestroo | |
| 2009/0226050 | A1 * | 9/2009 | Hughes | G08B 21/0208 382/124 |
| 2011/0186397 | A1 * | 8/2011 | Sheikh | A45C 13/00 190/120 |
| 2011/0214787 | A1 * | 9/2011 | Schulte | A45C 13/26 150/102 |
| 2015/0237981 | A1 * | 8/2015 | Godshaw | A45C 13/185 150/102 |
| 2016/0360351 | A1 | 12/2016 | Cabouli | |
| 2017/0198497 | A1 | 6/2017 | Tsai | |
| 2018/0279735 | A1 * | 10/2018 | Paul | E05B 37/0034 |
| 2018/0368536 | A1 * | 12/2018 | Newson | A45C 13/18 |
| 2018/0371794 | A1 * | 12/2018 | Zhang | E05B 65/52 |
| 2022/0218086 | A1 * | 7/2022 | Salminci | A45C 13/103 |

FOREIGN PATENT DOCUMENTS

| | | | | | |
|---|---|---|---|---|---|
| CN | 201806072 | U | | 4/2011 | |
| CN | 102783781 | A | | 11/2012 | |
| CN | 203789324 | U | * | 8/2014 | |
| CN | 106917550 | A | | 7/2017 | |
| CN | 108078133 | A | * | 5/2018 | A45C 13/103 |
| EP | 3239441 | A1 | * | 11/2017 | A44B 19/30 |
| GB | 2458889 | A | | 10/2009 | |
| GB | 2531937 | A | | 5/2016 | |
| GB | 2547913 | A | | 9/2017 | |
| WO | 2007101292 | A1 | | 9/2007 | |
| WO | 2015121630 | A1 | | 8/2015 | |

* cited by examiner

FIG. 11
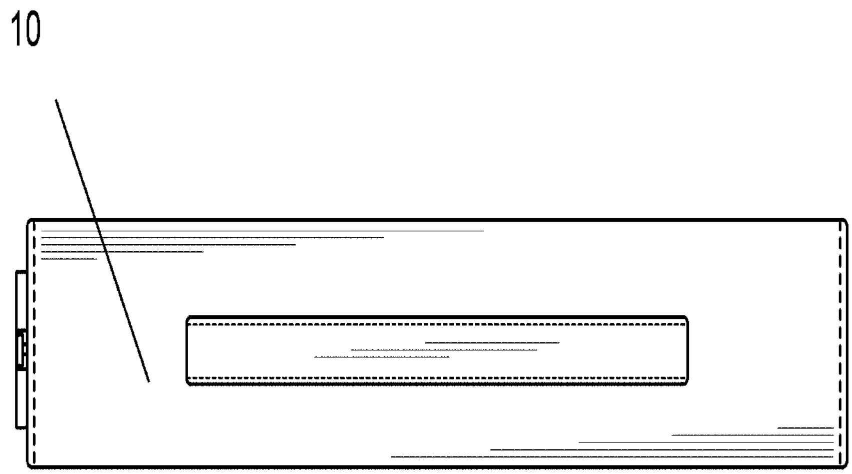
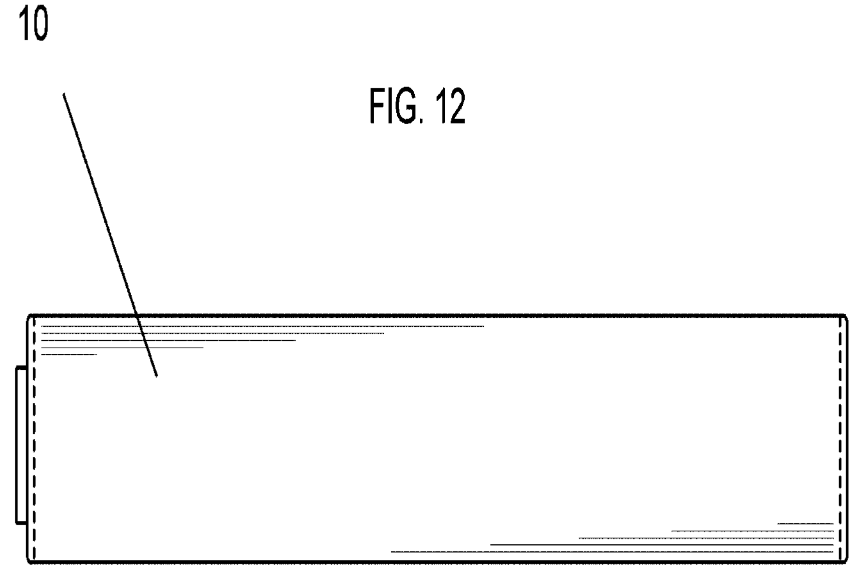
FIG. 12

HAND BAG WITH INTEGRATED FINGERPRINT LOCK AND ZIPPER AND/OR FLAP CLOSURE

CROSS REFERENCE TO RELATED APPLICATIONS

This application is a continuation of U.S. patent application Ser. No. 16/241,313, filed Jan. 7, 2019, entitled Hand Bag With Integrated Fingerprint Lock and Zipper and/or Flap Closure, now allowed, which is a continuation in part of U.S. Design application Ser. No. 29/665,253, filed Oct. 1, 2018, now issued as U.S. Design Patent No. D863,758, and U.S. Design application Ser. No. 29/671,327, filed Nov. 26, 2018, now issued as U.S. Design Patent No. D965,291.

FIELD OF INVENTION

The instant invention relates to an improvement in hand bag designs. More particularly, the instant invention relates to a hand bag, such a purse, wallet, tote, clutch, concealment bag, or wallet, for example, having an improved locking structure.

BACKGROUND OF INVENTION

The prior art includes various types of bags with locking mechanisms. More recently, these bags have included biometric features. One such prior example is CN201806072 directed to a wallet with fingerprint identification technique to prevent the theft wherein the wallet comprises a wallet purse body, an opening of the body is provided with an electronic wallet lock, the electronic lock connected to a controller, the controller connected to fingerprint lock and a buzzer and power source. The battery is a button battery. When the wallet is opened if the authorized fingerprint is not met, then an alarm sounds.

SUMMARY OF THE INVENTION

It is an object to improve on the design of fingerprint lock bags. An object is to improve on antitheft hand bag design.

Accordingly, one embodiment of the invention is directed to a hand bag having a bottom, sides connected to and extending from the bottom to provide forming a container with an open top. A zipper connects to the open top in a manner to enable closure of the top. The zipper has an end pull tab with a locking loop extending therefrom.

In another embodiment, one of the sides can preferably include an elongated upper end forming a flap which can fold over the open top and lay over a front face of an opposing side. The flap includes tab with a locking loop extending inwardly toward the face of the opposing side.

Integrally connected to the hand bag is a fingerprint lock having a housing with a front plate having a first opening for exposing a fingerprint identifying pad operably disposed in the housing and a second opening for receiving the locking loop therethrough, a power operated locking mechanism having a moving pin operably disposed in the housing which actuates the pin between a closed position below the second opening to lock the locking loop and an open position sufficiently disposed with respect to the second opening to not retain the locking loop when inserted through the second opening. A battery is operably disposed in the housing and connected to the powered operated locking mechanism.

The front plate has a back side formed with a plurality of threaded apertures and the housing has a complementary number of apertures through which mounting screws are inserted in a manner and through the housing on an inner side of the hand bag and through the hand bag to securely connect to the threaded apertures of the front plate to sandwich about a portion of the hang bag and secure the lock in place such that when the zipper fully closes the open top, the locking loop may be inserted into the second opening to enable the pin to move therethrough and lock the zipper in a closed position.

A controller is operably disposed in the housing and connected to the fingerprint pad and power operated locking mechanism for closing the opening and closing the pin based on a preprogrammed fingerprint identification being met. The handbag can preferably include a cut-proof material.

BRIEF DESCRIPTION OF THE DRAWINGS

FIG. 11 is a top view of the embodiment in FIG. 7.

FIG. 12 is a bottom view of the embodiment in FIG. 7.

DETAILED DESCRIPTION OF THE INVENTION

Figure 1:
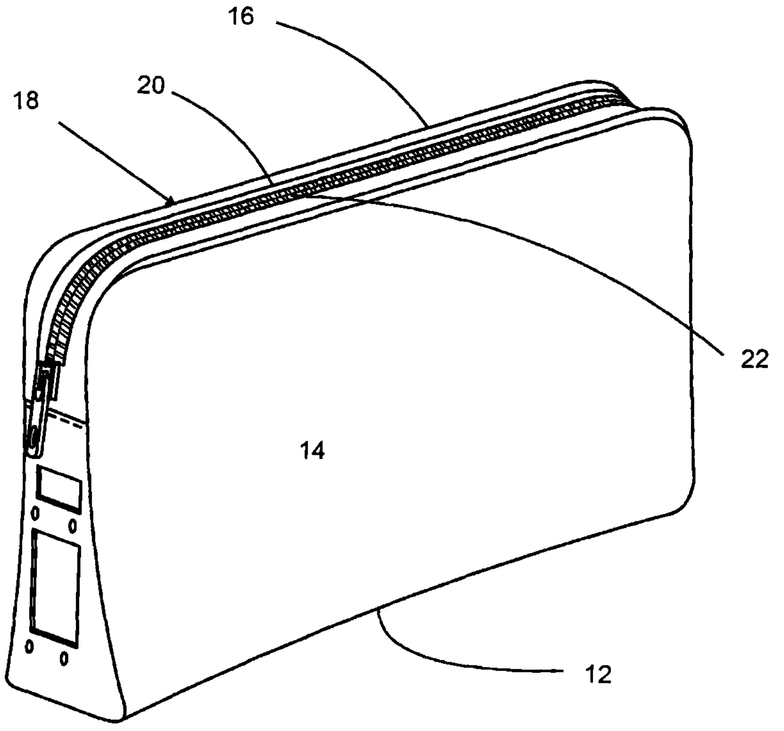
FIG. 1 is a front perspective view of a part of the hand bag of the invention.
Figure 2:
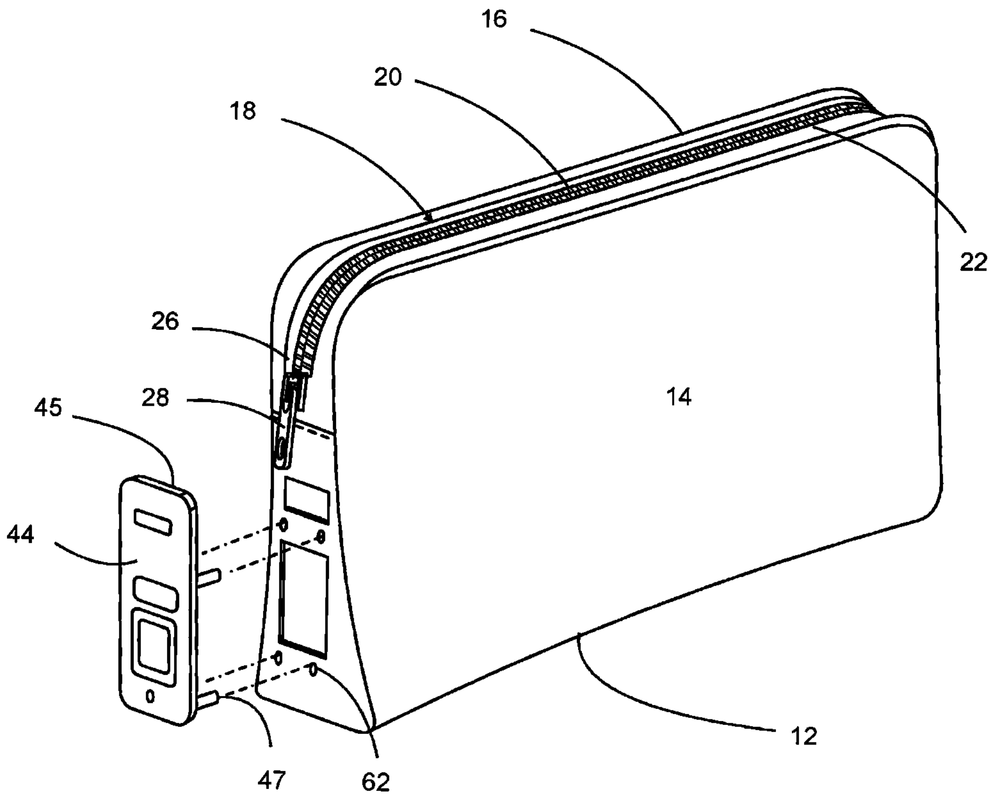
FIG. 2 is another front perspective view with a lock in exploded relation to the hand bag in FIG. 1.
Figure 3:
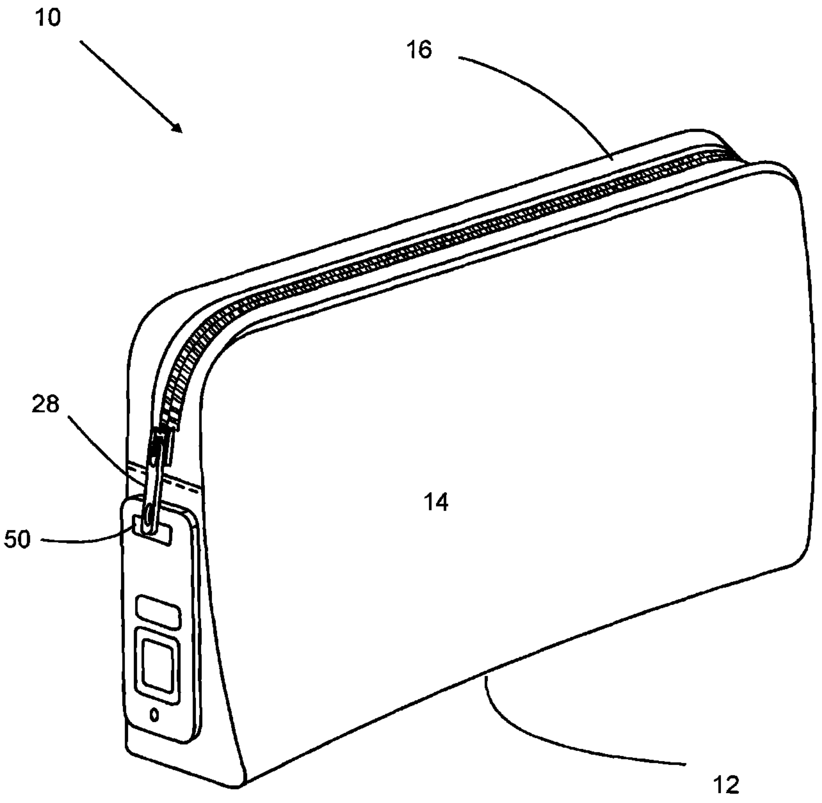
FIG. 3 is a front perspective view of an assembled embodiment of the invention.
Figure 4:
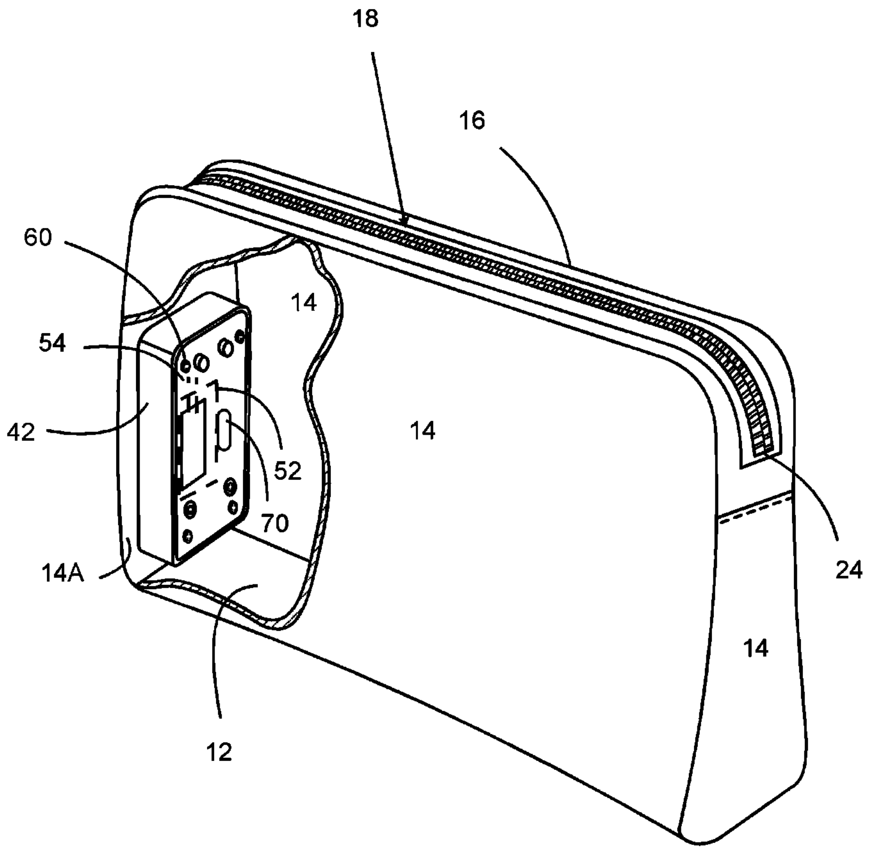
FIG. 4 is a cut-away back perspective illustrating a housing part of the lock inside a hand bag of FIG. 1.
Figure 5:
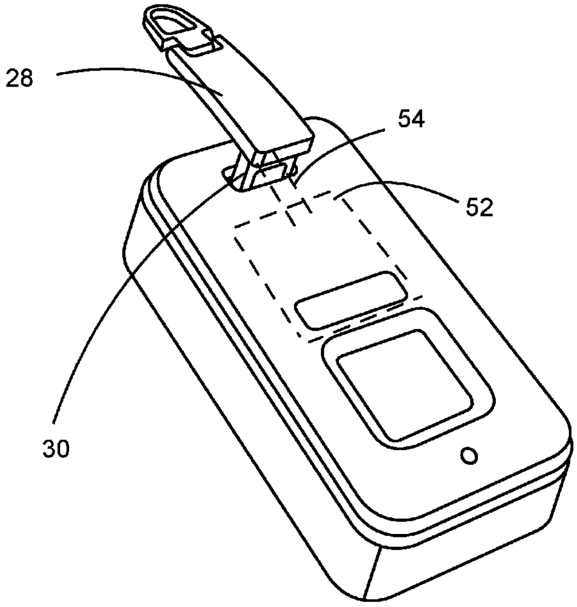
FIG. 5 is a top perspective view of a fingerprint lock of the invention in a locked mode.
Figure 6:
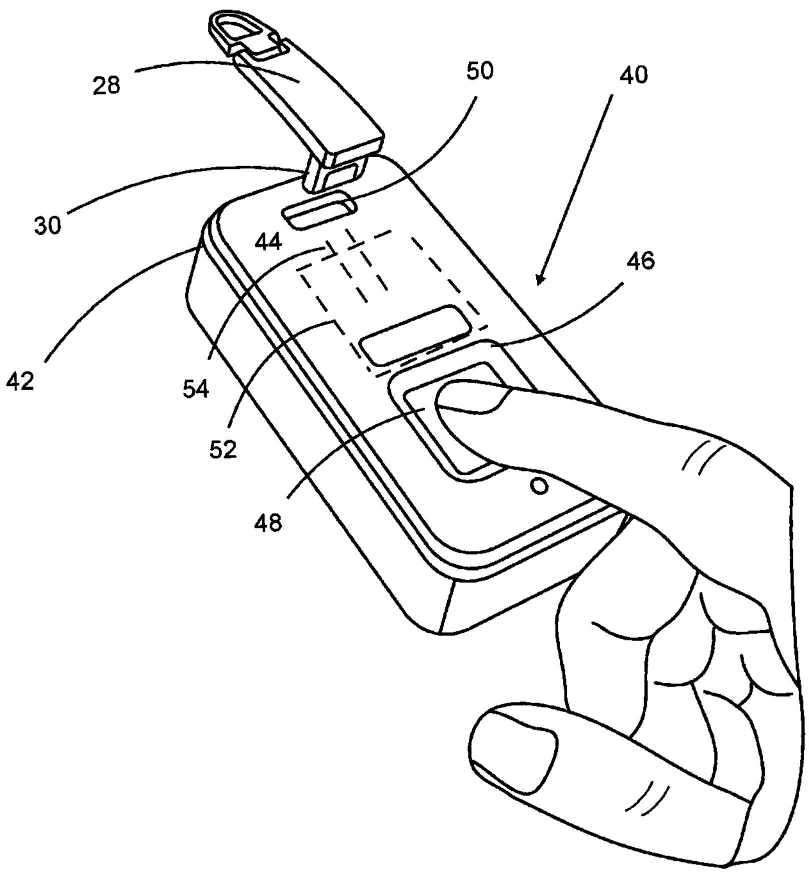
FIG. 6 is a top perspective view of a fingerprint lock of the invention in an unlocked mode.

Referring now to the drawings, the hand bag with integrated fingerprint lock and zipper is generally referred by the numeral 10, where like parts are referenced with like numerals.

The hand bag 10 has a bottom 12, sides 14, wherein it is contemplated that the side could be connectively one or more piece(s), which connect to and extending from the bottom 12. The sides 14 and interconnect to each other and provide an open top 16. A zipper 18 connects to the open top 16 in a manner to enable closure of the top 16. The zipper 18 has two mating portions 20 and 22, a fixed end 24 and an openable end 26. A pull tab 28 is provided on zipper 18 for opening and closing the two mating portions 20 and 22 and has a locking loop 30 extending therefrom.

In another embodiment, one of the sides 148 can preferably include an elongated upper end 14B' forming a flap which can fold over the open top 16 and lay over a front face of an opposing side 14C. The flap 14B' includes tab 28' with a locking loop extending inwardly toward the face of the opposing side 14C.

Integrally connected to the hand bag 10 is a fingerprint lock 40 having a housing 42 with a removable front plate 44. The front plate 44 has a first opening 46 for exposing a fingerprint identifying pad 48 operably disposed in the housing 42 and a second opening 50 for receiving the locking loop 30 of the pull tab 28 therethrough. A power operated locking mechanism 52 has a moving pin 54 operably disposed in the housing 42 which actuates the pin 54 between a closed position below the second opening 50 to lock the locking loop 30 and an open position sufficiently disposed with respect to the second opening 50 to not retain the locking loop 30 when inserted through the second opening 50. A battery 56 is operably disposed in the housing 42 and connected to the powered operated mechanism 52.

The front plate 44 has a back side 45 formed with a plurality of threaded apertures 47 and the housing 24 has a complementary number of apertures 25 through which mounting screws 60 are inserted in a manner and through the housing 42 on an inner surface of side 14A of the hand bag 10 and through respective holes 62 of the hand bag 10 to securely connect to the threaded apertures 47 of the front plate 44 to sandwich about a portion of side 14A of the hang bag 10 and secure the lock 40 in place. The lock 40 is disposed on the hand bag 40 such that when the zipper 18 fully closes the open top 16, the locking loop 30 of tab 28 may be inserted into the second opening 50 to enable the pin 54 to move therethrough and lock the zipper 18 in a closed position.

Figure 7:
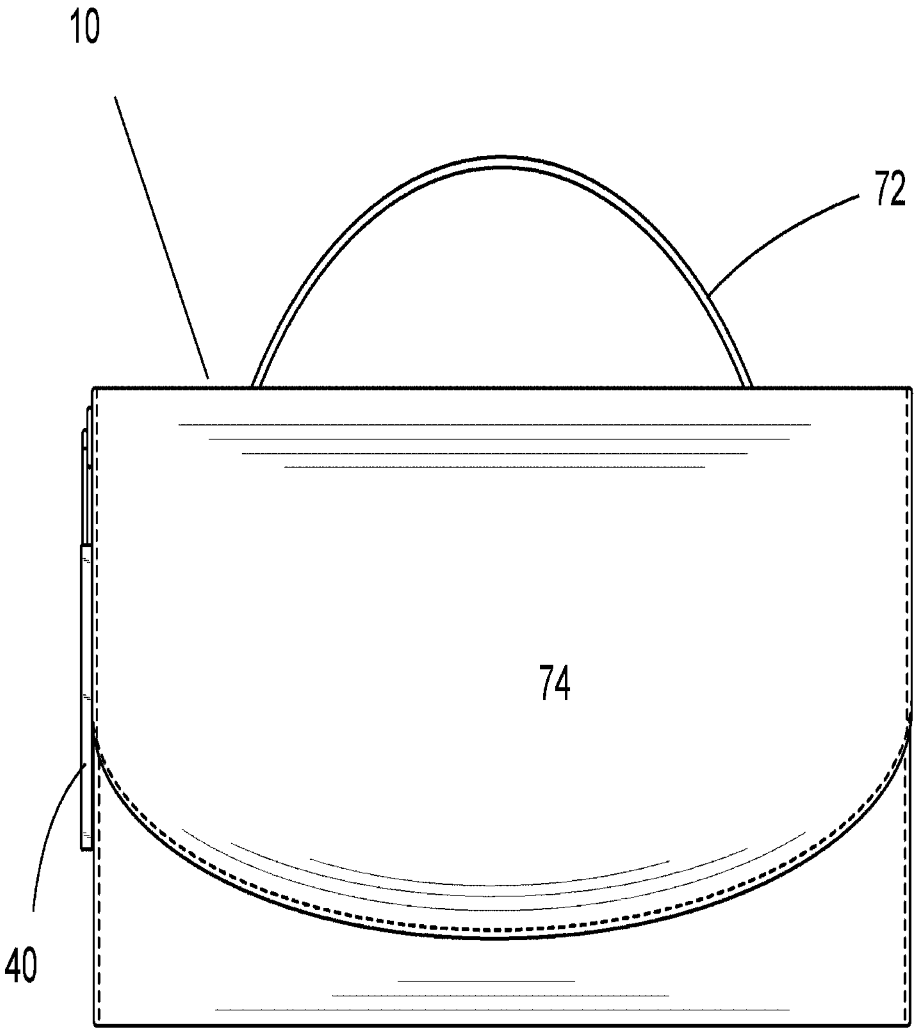
FIG. 7 illustrates front perspective of another embodiment of the invention.
Figure 8:
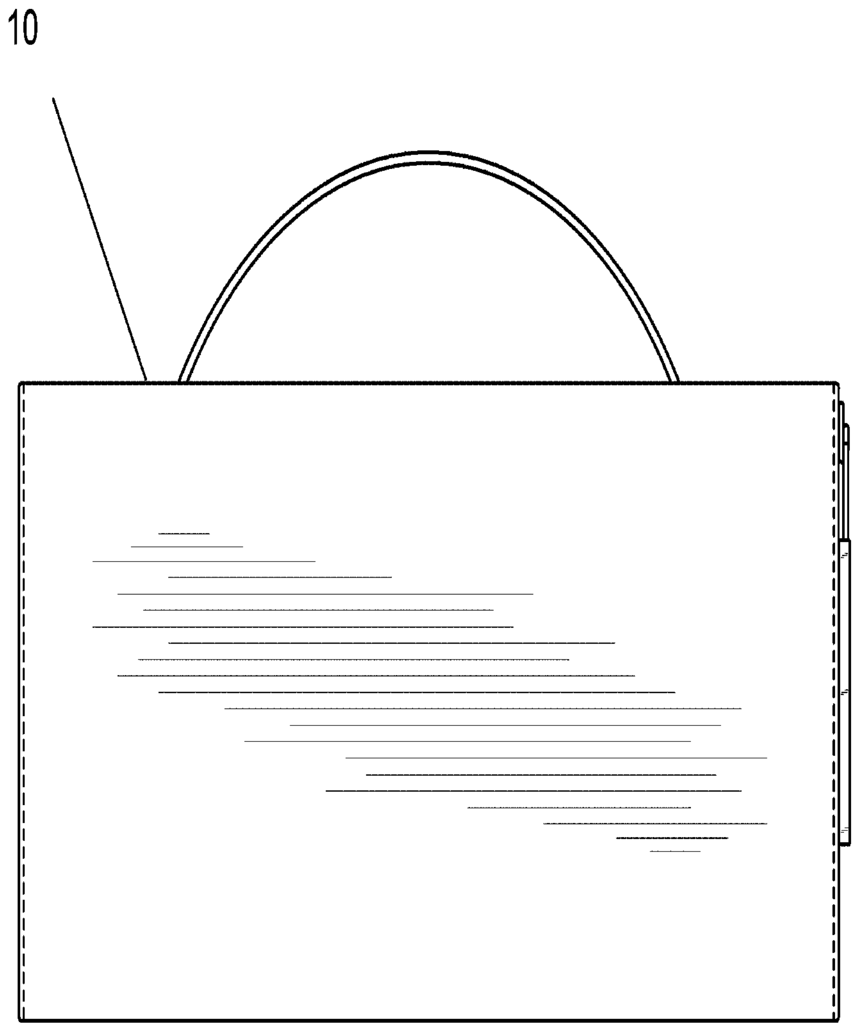
FIG. 8 is a back view of the embodiment in FIG. 7.
Figure 9:
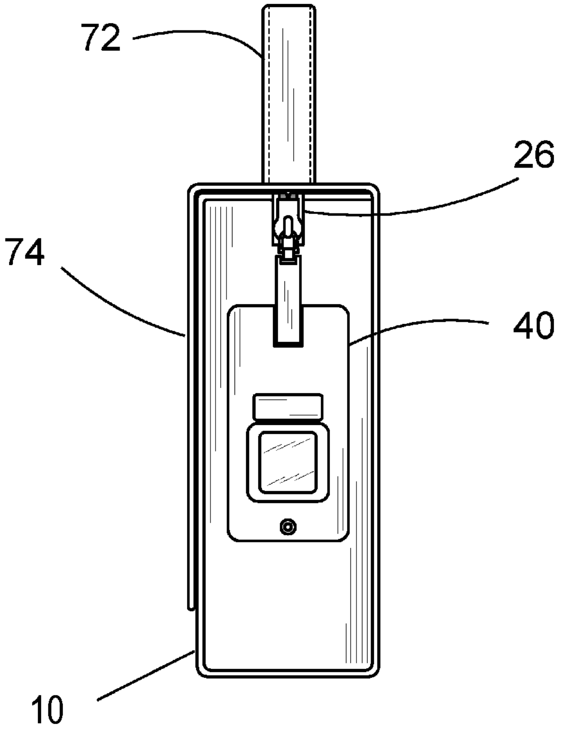
FIG. 9 is a right side elevation end view of the embodiment in FIG. 7.
Figure 10:
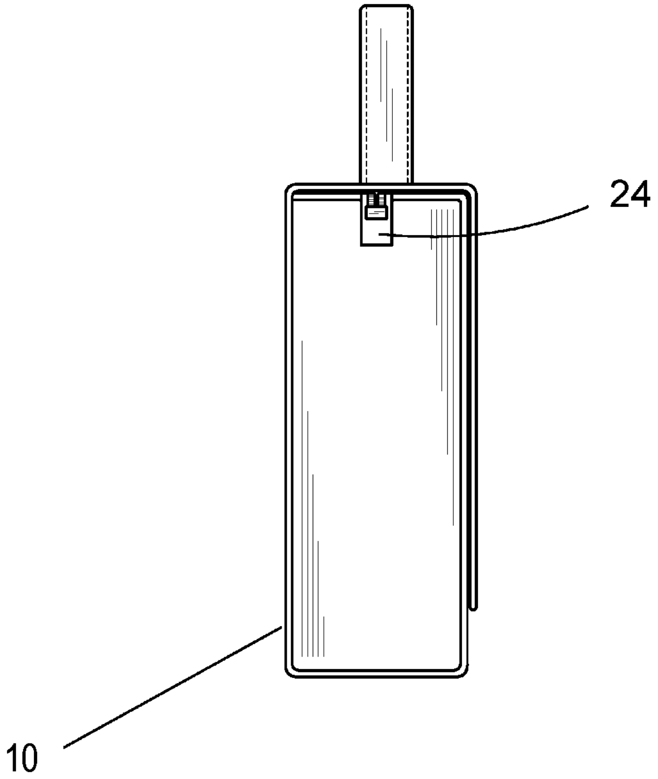
FIG. 10 is a left side of the embodiment in FIG. 7.
Figure 13:
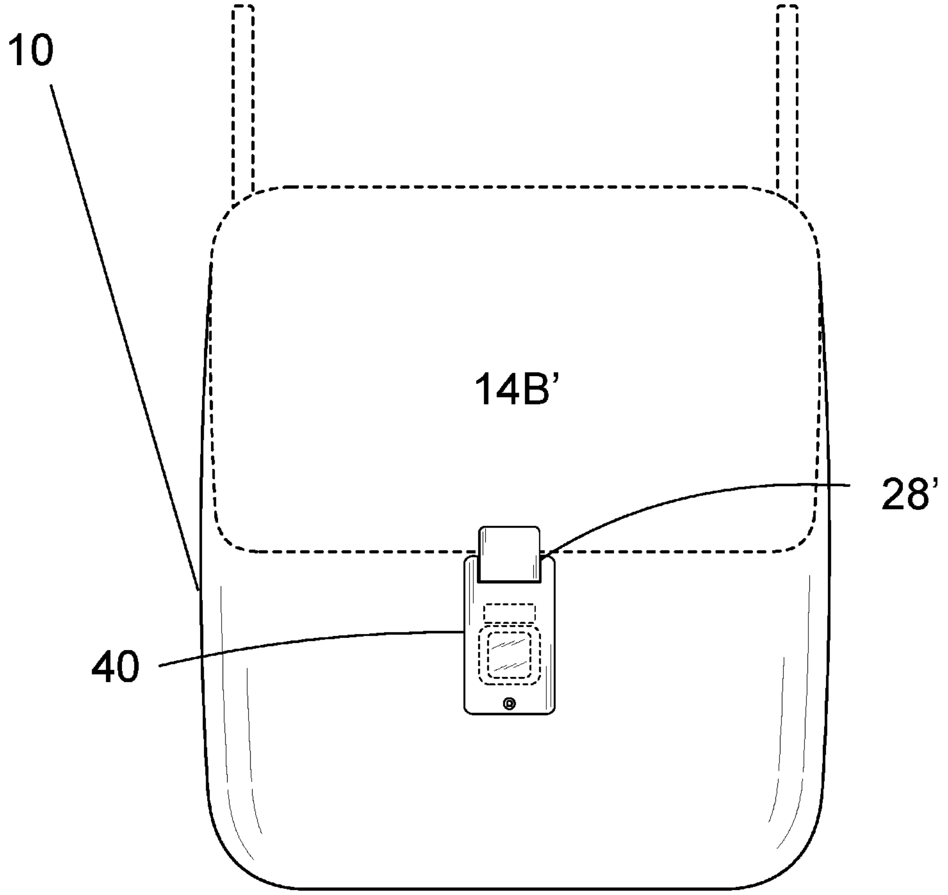
FIG. 13 illustrates front perspective of still another embodiment of the invention.
Figure 14:
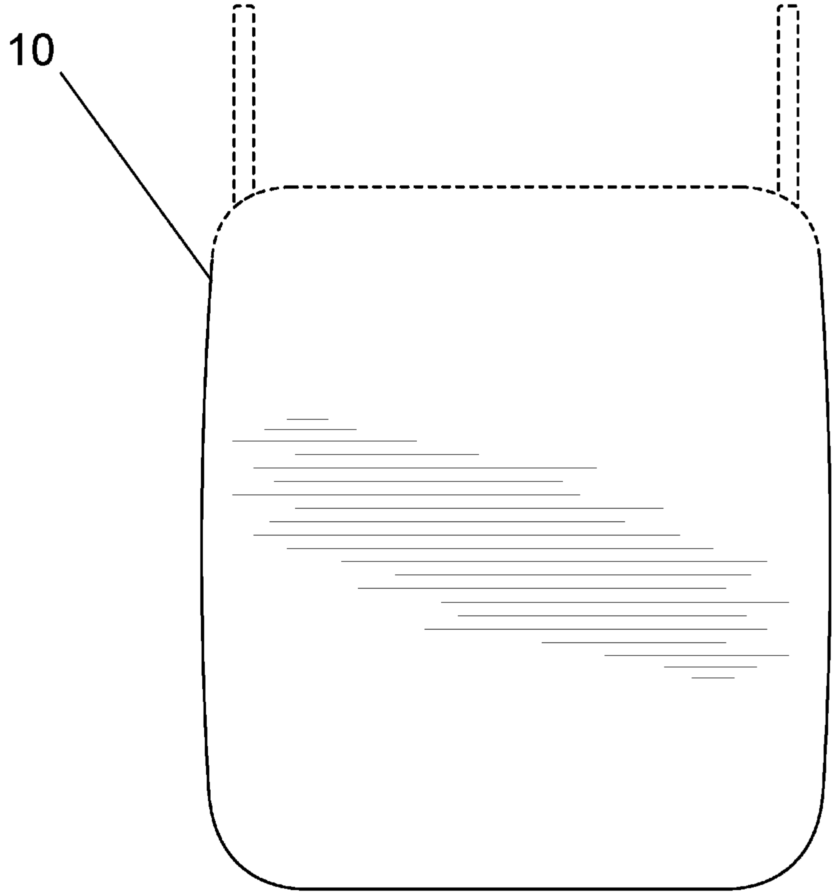
FIG. 14 is a back view of the embodiment in FIG. 13.
Figure 15:
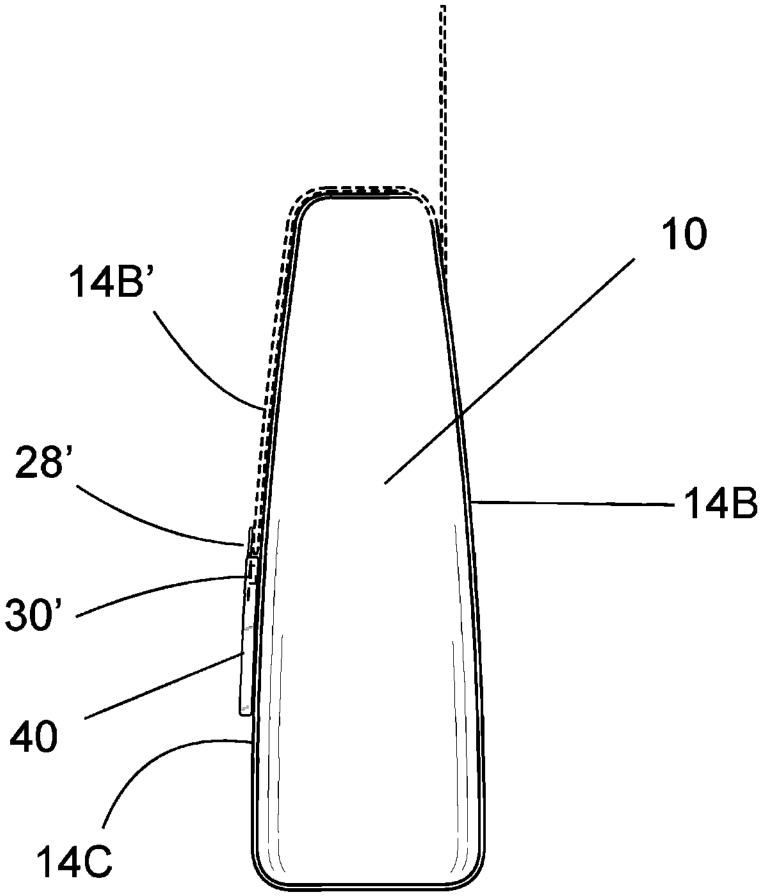
FIG. 15 is a right side elevation end view of the embodiment in FIG. 13.
Figure 16:
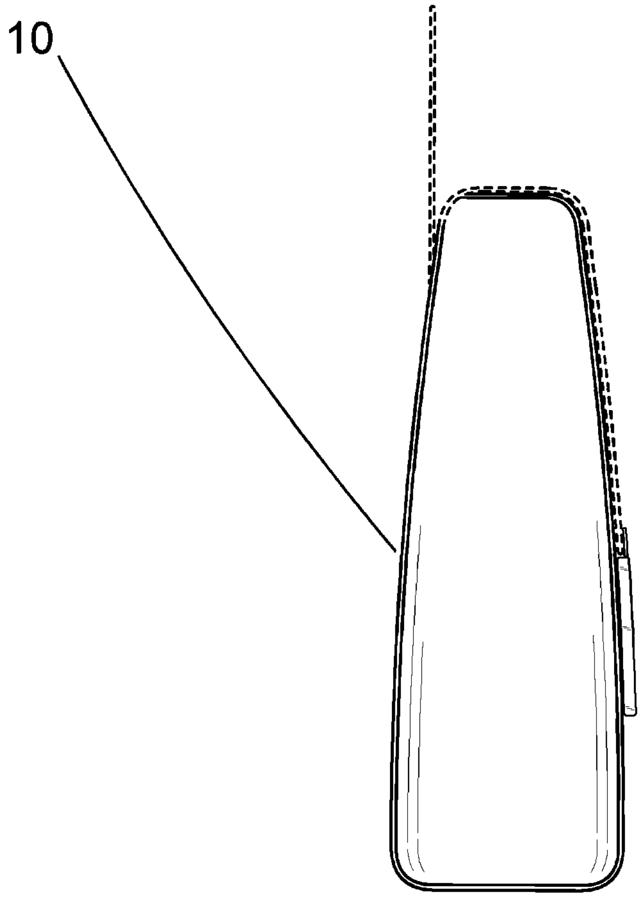
FIG. 16 is a left side of the embodiment in FIG. 13.
Figure 17:
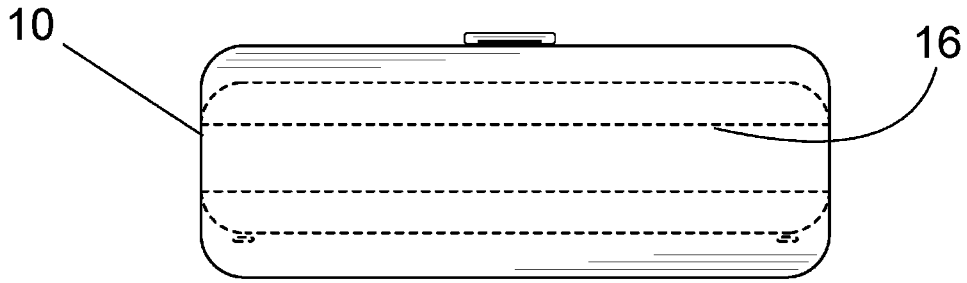
FIG. 17 is a top view of the embodiment in FIG. 13.
Figure 18:
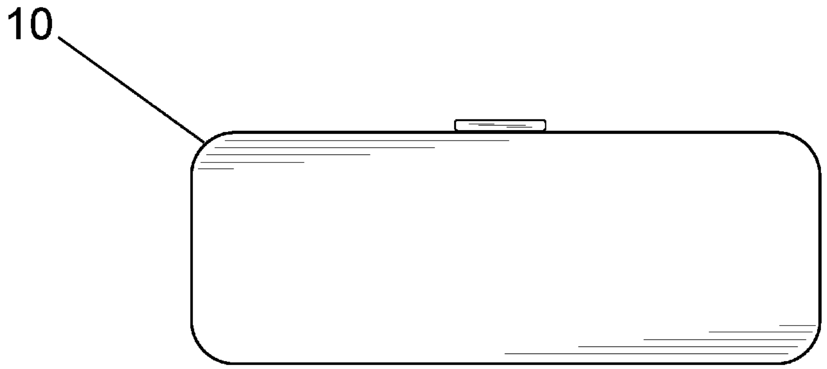
FIG. 18 is a bottom view of the embodiment in FIG. 13.

A controller 70 is operably disposed in the housing 42 and connected to the fingerprint pad 48 and power operated mechanism 52 for closing the opening and closing the pin 54 based on a preprogrammed fingerprint identification being met. A battery 56 is operably disposed in the housing 42 and connected to the controller 70 and powered operated mechanism 52. As seen in the embodiment seen in FIG. 7, the hand bag 10 can include a carrying strap 72 and a flap 74 covering the zipper 18, which could be several as seen in FIG. 13.

The handbag 10 can preferably include a cut-proof material. The instant claims are not to be overly limited by the above description. Rather, the claims appended hereto should be given the scope of protection to cover those modifications, improvements and derivations readily apparent to those skilled in the art.

The invention claimed is:

1. A hand bag with a lock, comprising:
- an open top;
- a bottom;
- a back side connected to the bottom, the back side extending upwardly from the bottom;
- a front side opposite the back side, the front side being connected to the bottom, the front side extending upwardly from the bottom;
- an elongated upper end forming a flap which extends from the back side and folds over the open top so as to lay over at least a portion of the front side, wherein the flap comprises:
  - a tab having a locking loop extending inwardly toward a face of the front side; and holes;
- a fingerprint lock comprising:
  - a housing comprising:
    - housing apertures corresponding to the holes;
    - a removable front plate comprising:
      - a first opening for exposing a fingerprint identifying pad operably disposed in the housing;
      - a second opening for receiving the locking loop of the tab therethrough;
      - threaded plate apertures corresponding to the housing apertures;
    - a moving pin operably disposed in the housing, the moving pin actuating between a closed position and an open position, the closed position locking the locking loop through engagement between the moving pin and the second opening, the open position sufficiently disposing the moving pin with respect to the second opening to not retain the locking loop when inserted through the second opening;
- threaded screws inserted through the threaded plate apertures of the removable front plate, the threaded screws further being inserted through the holes of the flap, the threaded screws further being inserted through the housing apertures, the threaded screws securing and sandwiching a portion of the flap between the removable front plate and the housing
- a power operated mechanism for selectively actuating the moving pin; and
- a controller that is operably disposed in the housing and connected to the fingerprint identifying pad and the power operated mechanism for selectively actuating the moving pin based on a preprogrammed fingerprint identification being met.

2. The hand bag of claim 1, wherein at least a portion of the hand bag comprises a cut-proof material.

3. The hand bag of claim 2, wherein the bottom and the plurality of sides are made from the cut-proof material.

4. The handbag of claim 1, which further includes a carrying strap connected thereto.

5. The handbag of claim 1 further comprises a zipper connected to the plurality of sides in order to provide selective closure of the open top, the zipper extending from a fixed end that is situated on a first side to an openable end that is situated on a second side opposite the first side.

* * * * *